Patented Nov. 13, 1945

2,389,015

UNITED STATES PATENT OFFICE 2,389,015

MANUFACTURE OF ARTIFICIAL TEXTILE FIBERS

Robert Louis Wormell, Coventry, England, assignor to Courtaulds Limited, London, England, a British company No Drawing. Application May 15, 1943, Serial No. 487,181. In Great Britain June 24, 1942

2 Claims. (Cl. 8—127.6)

This invention relates to the production of artificial textile fibers, both continuous and of staple length, from proteins, such as lactic casein and vegetable seed proteins, including soya bean casein and that obtained from ground nuts and peanuts, and the object of the invention is to obtain a fiber which is more resistant to the action of sodium carbonate solution during the various processes which are subsequently applied to it.

A process has already been described, in which solutions of vegetable globular proteins are extruded into an acid bath containing, among other ingredients, zinc chloride. It has also been proposed to extrude a solution of milk casein into a bath containing sulphuric acid, aluminium sulphate and sodium chloride, to which there may have been added small quantities, up to 10 per cent of the solution by weight, of other salts, such for example as magnesium sulphate, zinc sulphate and ammonium sulphate. It has also been proposed to take filaments and fibers made from protein solutions by coagulation and treatment with a hardening agent and to improve them in their resistance to hot dilute acids and to boiling water by subjecting them to the action of a dilute solution of a hydrogen halide, such as hydrochloric acid in a concentrated aqueous solution of a salt, such as ammonium chloride or the chlorides of such metals as sodium, potassium, calcium, zinc, magnesium or lithium.

I have now found that I can obtain fibers from milk casein or vegetable seed proteins, such as soya bean casein and the proteins from ground nuts and peanuts, by treating such fibers, after their production in an acid bath, with a solution of a zinc salt or a cadmium salt in the absence of acid, and that the fibers so obtained possess a considerably greater resistance to the action of dilute sodium carbonate solutions and other mild alkaline fluids than fibers which have not been subjected to such treatment. This is of importance, because it is often desired to treat protein fibers with such solutions when working them up into commercial products.

The following examples will help to illustrate the nature of this invention which, however, is not restricted to these examples.

Example 1

An 18 per cent solution of milk casein in dilute caustic soda solution is extruded through fine orifices into a bath containing in each liter 90 grams of sulfuric acid and 360 grams of sodium sulphate. After passing for a few minutes first through an aqueous solution containing 230 grams of sodium chloride per liter, and then through an aqueous bath containing in each liter 190 grams of aluminium sulphate and 140 grams of sodium chloride, the fibers are given a preliminary hardening treatment for 10 hours at 28° centigrade in a solution containing in each liter 250 grams of sodium sulphate and 40 grams of formaldehyde. The fibers are then insolubilised by immersing them for 16 hours at 25° centigrade in a bath containing in each liter 400 grams of sulphuric acid, 300 grams of sodium sulphate and 40 grams of formaldehyde. They are then washed free from acid and sodium sulphate and placed in a bath prepared from 3.4 grams of zinc sulphate ($ZnSO_4.7H_2O$) and 1600 cubic centimeters of water to which 1 cubic centimeter of normal sodium hydroxide solution has been added, giving rise to a slight precipitate. After leaving the fibers in this solution for 16 hours at 25° centigrade, much of the precipitate has disappeared. After washing the threads with water and drying, they show a reduced tendency to swell in 1 per cent of sodium carbonate solution.

Example 2

Casein thread which has been obtained by extrusion and coagulation, as described in the foregoing Example 1, is passed for a few minutes, first through an aqueous solution containing 230 grams of sodium chloride per liter and then through an aqueous bath containing in each liter 190 grams of aluminium sulphate and 140 grams of sodium chloride. The fibers are then cut into short lengths and hardened in a bath containing in each liter 455 grams of aluminium sulphate and 56 grams of formaldehyde and which has been made basic by the addition to every liter of 68 grams of sodium carbonate. The fibers are then taken from this bath, washed, centrifuged and placed in a bath containing in each liter 256 grams of sulphuric acid, 370 grams of sodium sulphate and 56 grams of formaldehyde. The material is left in this bath at 25° centigrade for 48 hours and then heated in it for a further 8 hours at 50° centigrade. It is then washed and dried and treated for 16 hours at 25° centigrade in a bath prepared from 11.6 liters of water, 2.7 kilograms of zinc chloride and 1.4 liters of 40 per cent formaldehyde solution. The fibers are then washed and dried.

Example 3

In the above Example 2, the bath of zinc chloride is substituted by a bath consisting of 40 per cent solution of zinc acetate in water, to which has been added 0.4 per cent of caustic soda. The fibers are left in this bath for 16 hours at 25° centigrade and then washed and dried.

Example 4

5 kilograms of freshly extruded casein threads are treated at room temperature for 20 hours in a hardening bath containing 363 grams of aluminium sulphate, 38 grams of formaldehyde and 93 grams of sodium carbonate per liter. The threads are centrifuged, washed and treated for 48 hours at 35° centigrade in a bath containing per liter 252 grams of sulphuric acid, 375 grams of sodium sulphate, 62 grams of formaldehyde and 7 grams of aluminium sulphate. After centrifuging, washing and treating for 20 minutes in a 0.25 per cent solution of sodium bicarbonate, the threads are washed and immersed for 44 hours at 25° centigrade in a solution of 50 per cent zinc chloride in water containing 40 grams of formaldehyde per liter. The threads are washed and dried. They contain 7 per cent of zinc oxide and they do not become highly swollen when placed in a 6 per cent sodium carbonate solution.

Example 5

An 18 per cent solution of milk casein in dilute caustic soda solution, is extruded through fine orifices into a bath containing in each liter 90 grams of sulphuric acid and 360 grams of sodium sulphate. After passing for a few minutes first through an aqueous solution containing 230 grams of sodium chloride per liter, and then through an aqueous bath containing in each liter 190 grams of aluminium sulphate and 140 grams of sodium chloride, the fibers are given a preliminary hardening treatment for 10 hours at 28° centigrade in a solution containing in each liter 250 grams of sodium sulphate, and 40 grams of formaldehyde. The fibers are then insolubilised by immersing them in a bath containing in each liter 400 grams of sulphuric acid, 300 grams of sodium sulphate and 40 grams of formaldehyde. They are then washed free from acid and sodium sulphate, and placed in a bath prepared from 100 grams of cadmium nitrate ($Cd(NO_3)_2.4H_2O$), 1000 cubic centimeters of water and 200 cubic centimeters of normal caustic soda solution. The above bath contains some precipitated cadmium hydroxide. The fibers are left for 24 hours at 25° centigrade in the above mixture and then washed and dried. The fibers show an improved resistance to soap solution.

The process of this invention can also be applied to casein fibers after they have been woven or knitted into the form of fabric. Where the term "casein" is used in the claims it is to be understood to cover both lactic casein and vegetable seed protein.

What I claim is:

1. A process for increasing the resistance to the action of sodium carbonate and other mild alkaline solutions of hardened artificial textile fibers obtained from casein which consists in soaking the said fibers in an aqueous solution containing a salt taken from the group consisting of zinc salts and cadmium salts, and from which solution any added free acid has been excluded, and immediately after said soaking washing the treated fibers free from water-soluble compounds and then drying the fibers.

2. A process for increasing the resistance to the action of sodium carbonate and other mild alkaline solutions of hardened artificial textile fibers obtained from casein which consists in soaking the said fibers in an aqueous solution containing a zinc salt, and from which solution any added free acid has been excluded, and immediately after said soaking washing the treated fibers free from water-soluble compounds and then drying the fibers.

ROBERT LOUIS WORMELL.